W. CLEMSON.
SAW-HANDLE.
No. 7,078. Reissued April 25, 1876.
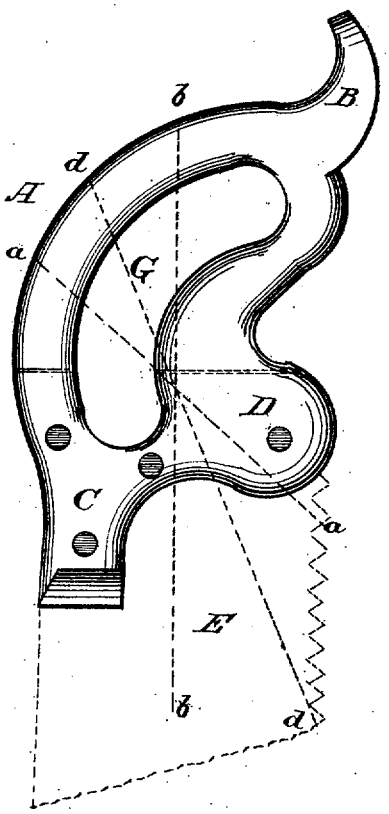
Witnesses:
P. C. Dieterich
F. H. Duffy.
Inventor:
William Clemson
Per: C. H. Watson & Co. Attorneys.
N. PETERS, PHOTO-LITHOGRAPHER, WASHINGTON, D. C.

UNITED STATES PATENT OFFICE.

WILLIAM CLEMSON, OF MIDDLETOWN, NEW YORK, ASSIGNOR TO THE WHEELER, MADDEN & CLEMSON MANUFACTURING COMPANY.

IMPROVEMENT IN SAW-HANDLES.

Specification forming part of Letters Patent No. 148,415, dated March 10, 1874; reissue No. 7,078, dated April 25, 1876; application filed March 31, 1876.

*To all whom it may concern:*

Be it known that I, WILLIAM CLEMSON, of Middletown, in the county of Orange and State of New York, have invented certain new and useful Improvements in Saw-Handles; and I do hereby declare that the following is a full, clear, and exact description thereof, that will enable others skilled in the art to which it appertains to make and use the same, reference being had to the accompanying drawing, and to the letters of reference marked thereon, which form a part of this specification.

The nature of my invention consists in the construction of a saw-handle having provision for one or both hands by means of a continuous circular or segmental slot; and also in combining with a handle a saw having a slot cut in its heel, so that the saw-plate will project in the handle on both sides of a portion of the segmental slot, as will be hereinafter more fully set forth.

In order to enable others skilled in the art to which my invention appertains to make and use the same, I will now proceed to describe its construction and operation, referring to the annexed drawing, which represents a side view of my saw-handle.

The saw-handle is cut of a single piece of wood, the outer edge A forming about one-fourth of a circle, and provided at the lower or rear with a projection or rest, B. The front end forms a projection, C, and another projection, D, is formed a suitable distance below the former. In the body of the handle is formed one continuous curved or segmental slot, G, forming part of a circle, having the same, or nearly the same, center as the back edge A. The two projections, C and D, as well as the intervening portion of the handle, have a slit cut in them for the insertion of the saw E. This slit extends up into the handle on both sides of the front portion of the slot G, and in the heel of the saw-blade E is formed a slot corresponding with said front portion of the slot G, so that the saw-blade will extend up a suitable distance on both sides thereof, which adds very much to the strength of the handle, and brings the hand or hands nearer the blade.

The continuous slot G is for the purpose of allowing the operator to use one or both hands in sawing.

By applying one hand on the line *a a* and the other on the line *b b*, the force of the two hands operate, combined, in the direction of the line *d d*, which is just the proper direction to push in and along the wood. But if, as is often the case, it is desired to use only one hand, neither position *a* or *b* would be desirable for easy and quick sawing; but, the slot being continuous, the hand may be changed to *d*, where the one hand will operate the same as both hands at *a* and *b* combined.

Another advantage of the continuous slot is that the angle of the saw may be changed, and the hand or hands moved to correspond, without changing the position of the body.

I am aware that a saw-handle is used which has two separate and distinct slots, as shown in Patent No. 132,258, of October 15, 1872, one for each hand, which I fully disclaim; but, in that case, the hands cannot be moved on the handle, but occupy the same relative position all the time; neither can one hand alone be used to operate in the same direction as the two hands combined.

My construction of the saw-handle has also the advantages that it requires less material, is more simple, and requires less labor in its manufacture.

Having thus fully described my invention, what I claim as new, and desire to secure by Letters Patent, is—

1. As a new article of manufacture, a saw-handle provided with a continuous circular or segmental slot, G, to form provision for the use of one or both hands, substantially as and for the purposes herein set forth.

2. In combination with the saw-handle having an opening for the hand or hands, the blade E, the heel having an opening corresponding to the opening in the handle, as herein shown and described.

In testimony that I claim the foregoing I have hereunto set my hand.

WILLIAM CLEMSON.

Witnesses:

WM. MILLSPAUGH,

E. M. MADDEN, Jr.